(12) United States Patent
Nakajo

(10) Patent No.: US 7,489,611 B2
(45) Date of Patent: Feb. 10, 2009

(54) OPTICAL DISC DEVICE

(75) Inventor: Yukihisa Nakajo, Yokohama (JP)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 625 days.

(21) Appl. No.: 11/272,731

(22) Filed: Nov. 15, 2005

(65) Prior Publication Data

US 2006/0104178 A1    May 18, 2006

(30) Foreign Application Priority Data

Nov. 15, 2004  (JP)  ............................ 2004-330992
Jul. 28, 2005   (JP)  ............................ 2005-219488

(51) Int. Cl.
    *G11B 20/10*    (2006.01)
(52) U.S. Cl. .................................................. 369/59.12
(58) Field of Classification Search .................. None
    See application file for complete search history.

(56) References Cited

U.S. PATENT DOCUMENTS

| 5,345,434 A * | 9/1994 | Ide et al. .................. 369/59.12 |
| 6,188,656 B1 * | 2/2001 | Shoji et al. ................ 369/47.25 |
| 6,982,939 B2 * | 1/2006 | Powelson et al. .......... 369/47.53 |
| 2004/0017752 A1 * | 1/2004 | Furumiya et al. ......... 369/47.53 |
| 2004/0017755 A1 * | 1/2004 | Kato ....................... 369/59.11 |

FOREIGN PATENT DOCUMENTS

| JP | 2000-030254 | 1/2000 |
| JP | 2003-030837 | 1/2003 |
| JP | 2003-030837 | 10/2003 |
| KR | 1020010056435 A | 7/2001 |

\* cited by examiner

*Primary Examiner*—Joseph H Feild
*Assistant Examiner*—Christopher R. Lamb
(74) *Attorney, Agent, or Firm*—Volentine & Whitt, PLLC.

(57) ABSTRACT

An optical disc device measures lengths of each mark and each land recorded using a reference write strategy and an alternative write strategy in which at least one parameter is varied in two or more combinations of marks and lands. A deviation value of each of the marks and lands is computed by shifting the write strategy on the basis of the lengths. Inherent contractile rates of all marks and lands are computed from the computed deviation value and the probability of occurrence of each of the marks and lands. A variance of the deviations by the combination of each of the marks and lands is computed from the computed deviation value. The write strategy is set using the computed inherent contractile rates such that the computed variance is minimized.

4 Claims, 17 Drawing Sheets

Fig. 3A

|      | 3TL   | 4TL   | 5TL  | 6TL  |
|------|-------|-------|------|------|
| 3TM  | -6.7  | 0.2   | 17.2 | 24.8 |
| 4TM  | -24.2 | -7.1  | 11.7 | 18.6 |
| 5TM  | -28.2 | -10.6 | 7.4  | 11.8 |
| 6TM  | -23.2 | -1.9  | 12.9 | 18.5 |

Fig. 3B

|      | 3TL   | 4TL   | 5TL   | 6TL  |
|------|-------|-------|-------|------|
| 3TM  | -11.4 | -25.6 | -4.8  | 41.3 |
| 4TM  | -28.1 | -32.1 | -11.6 | 35.0 |
| 5TM  | -29.7 | -31.7 | -11.8 | 27.6 |
| 6TM  | -7.2  | 11.9  | 27.5  | 33.7 |

Fig. 3C

|      | 3TL  | 4TL   | 5TL   | 6TL |
|------|------|-------|-------|-----|
| 3TM  | -2.4 | -12.9 | -11.0 | 8.3 |
| 4TM  | -2.0 | -12.5 | -11.6 | 8.2 |
| 5TM  | -0.7 | -12.0 | -9.6  | 7.9 |
| 6TM  | 8.0  | 6.9   | 7.3   | 7.6 |

Fig. 5

|     | 3T | 4T | 5T | 6T | 7T | 8T | 6T | 7T | 8T |
|-----|----|----|----|----|----|----|----|----|----|
| 3T  | 1  | 3  | 7  | 13 | 21 | 31 | 43 | 57 | 73 |
| 4T  | 2  | 4  | 8  | 14 | 22 | 32 | 44 | 58 | 74 |
| 5T  | 5  | 6  | 9  | 15 | 23 | 33 | 45 | 59 | 75 |
| 6T  | 10 | 11 | 12 | 16 | 24 | 34 | 46 | 60 | 76 |
| 7T  | 17 | 18 | 19 | 20 | 25 | 35 | 47 | 61 | 77 |
| 8T  | 26 | 27 | 28 | 29 | 30 | 36 | 48 | 62 | 78 |
| 9T  | 37 | 38 | 39 | 40 | 41 | 42 | 49 | 63 | 79 |
| 10T | 50 | 51 | 52 | 53 | 54 | 55 | 56 | 64 | 80 |
| 11T | 65 | 66 | 67 | 68 | 69 | 70 | 71 | 72 | 81 |

Fig. 6

|      | 3TS   | 4TS   | 5TS   | 6TS   | 7TS   | 8TS   | 9TS   | 10TS  | 11TS  | 14TS  |
|------|-------|-------|-------|-------|-------|-------|-------|-------|-------|-------|
| 3TM  | 6.09  | 0.88  | 1.00  | 0.70  | -1.99 | -2.84 | -2.94 | -1.38 | -5.47 | 0.00  |
| 4TM  | 4.27  | 0.59  | 1.10  | 1.40  | -1.28 | -1.08 | -1.26 | -2.38 | 0.03  | 0.05  |
| 5TM  | 0.22  | -3.44 | -2.91 | -3.08 | -5.35 | -5.09 | -5.30 | -4.26 | -5.38 | -2.13 |
| 6TM  | -0.10 | -3.57 | -5.05 | -4.49 | -6.48 | -6.71 | -6.35 | -6.08 | -9.47 | -8.93 |
| 7TM  | 1.95  | -2.21 | -2.16 | -2.12 | -4.35 | -5.01 | -5.10 | -6.68 | -2.83 | -0.64 |
| 8TM  | 3.22  | -1.53 | -1.08 | -1.57 | -4.00 | -3.56 | -4.16 | -6.33 | -0.30 | -4.12 |
| 9TM  | 1.82  | -2.17 | -0.43 | -0.28 | -3.38 | -4.43 | -1.02 | -2.39 | -6.50 | -0.53 |
| 10TM | 2.71  | -1.82 | -2.95 | -0.81 | -1.91 | -6.50 | -1.85 | 0.24  | -8.69 | -1.49 |
| 11TM | 3.31  | -2.68 | -2.51 | -0.67 | 8.01  | -6.71 | 0.00  | 0.00  | 0.00  | -1.62 |
| 14TM | 0.00  | 0.06  | 0.00  | 0.00  | 0.00  | 0.00  | 0.00  | 0.00  | 0.00  | 0.00  |

Fig. 7

|      | 3TS   | 4TS   | 5TS   | 6TS  | 7TS   | 8TS  | 9TS  | 10TS | 11TS  | 14TS |
|------|-------|-------|-------|------|-------|------|------|------|-------|------|
| 3TM  | -4.53 | -0.63 | 5.43  | 6.34 | 8.97  | 8.60 | 7.14 | 7.30 | 3.09  | 0.00 |
| 4TM  | -6.25 | -2.74 | 3.00  | 4.39 | 7.41  | 7.24 | 6.84 | 7.38 | 6.31  | 7.06 |
| 5TM  | -5.58 | -1.68 | 4.23  | 6.02 | 7.98  | 8.41 | 8.58 | 7.08 | 8.01  | 5.36 |
| 6TM  | -5.76 | -1.86 | 4.03  | 5.56 | 8.00  | 9.07 | 7.82 | 8.33 | 7.49  | 9.99 |
| 7TM  | -7.14 | -2.61 | 2.60  | 4.12 | 6.94  | 7.82 | 6.62 | 7.74 | 7.12  | 5.38 |
| 8TM  | -7.92 | -3.46 | 2.05  | 4.08 | 6.57  | 6.88 | 6.90 | 6.66 | 11.43 | 5.93 |
| 9TM  | -7.68 | -2.85 | 2.10  | 3.87 | 6.25  | 6.15 | 4.98 | 7.51 | 1.45  | 6.04 |
| 10TM | -7.79 | -2.79 | 2.71  | 3.64 | 5.75  | 8.50 | 3.29 | 4.21 | 8.44  | 5.51 |
| 11TM | -8.24 | -2.86 | -0.72 | 1.99 | -1.43 | 8.84 | 0.00 | 0.00 | 0.00  | 3.74 |
| 14TM | 0.00  | -5.37 | 0.00  | 0.00 | 0.00  | 0.00 | 0.00 | 0.00 | 0.00  | 0.00 |

Fig. 14

|  | 3TS | 4TS | 5TS | 6TS | 7TS | 8TS | 9TS | 10TS | 11TS | 14TS |
|---|---|---|---|---|---|---|---|---|---|---|
| 3TM | 6.09 | 0.88 | 1.00 | 0.70 | -1.99 | -2.84 | -2.94 | -1.38 | -5.47 | 0.00 |
| 4TM | 4.27 | 0.59 | 1.10 | 1.40 | -1.28 | -1.08 | -1.26 | -2.38 | 0.03 | 0.05 |
| 5TM | 0.22 | -3.44 | -2.91 | -3.08 | -5.35 | -5.09 | -5.30 | -4.26 | -5.38 | -2.13 |
| 6TM | -0.10 | -3.57 | -5.05 | -4.49 | -6.48 | -6.71 | -6.35 | -6.08 | -9.47 | -8.93 |
| 7TM | 1.95 | -2.21 | -2.16 | -2.12 | -4.35 | -5.01 | -5.10 | -6.68 | -2.83 | -0.64 |
| 8TM | 3.22 | -1.53 | -1.08 | -1.57 | -4.00 | -3.56 | -4.16 | -6.33 | -0.30 | -4.12 |
| 9TM | 1.82 | -2.17 | -0.43 | -0.28 | -3.38 | -4.43 | -1.02 | -2.39 | -6.50 | -0.53 |
| 10TM | 2.71 | -1.82 | -2.95 | -0.81 | -1.91 | -6.50 | -1.85 | 0.24 | -8.69 | -1.49 |
| 11TM | 3.31 | -2.68 | -2.51 | -0.67 | 8.01 | -6.71 | 0.00 | 0.00 | 0.00 | -1.62 |
| 14TM | 0.00 | 0.06 | 0.00 | 0.00 | 0.00 | 0.00 | 0.00 | 0.00 | 0.00 | 0.00 |

Fig. 15

|      | 3TS   | 4TS   | 5TS   | 6TS  | 7TS   | 8TS  | 9TS  | 10TS | 11TS  | 14TS |
|------|-------|-------|-------|------|-------|------|------|------|-------|------|
| 3TM  | -4.53 | -0.63 | 5.43  | 6.34 | 8.97  | 8.60 | 7.14 | 7.30 | 3.09  | 0.00 |
| 4TM  | -6.25 | -2.74 | 3.00  | 4.39 | 7.41  | 7.24 | 6.84 | 7.38 | 6.31  | 7.06 |
| 5TM  | -5.58 | -1.68 | 4.23  | 6.02 | 7.98  | 8.41 | 8.58 | 7.08 | 8.01  | 5.36 |
| 6TM  | -5.76 | -1.86 | 4.03  | 5.56 | 8.00  | 9.07 | 7.82 | 8.33 | 7.49  | 9.99 |
| 7TM  | -7.14 | -2.61 | 2.60  | 4.12 | 6.94  | 7.82 | 6.62 | 7.74 | 7.12  | 5.38 |
| 8TM  | -7.92 | -3.46 | 2.05  | 4.08 | 6.57  | 6.88 | 6.90 | 6.66 | 11.43 | 5.93 |
| 9TM  | -7.68 | -2.85 | 2.10  | 3.87 | 6.25  | 6.15 | 4.98 | 7.51 | 1.45  | 6.04 |
| 10TM | -7.79 | -2.79 | 2.71  | 3.64 | 5.75  | 8.50 | 3.29 | 4.21 | 8.44  | 5.51 |
| 11TM | -8.24 | -2.86 | -0.72 | 1.99 | -1.43 | 8.84 | 0.00 | 0.00 | 0.00  | 3.74 |
| 14TM | 0.00  | -5.37 | 0.00  | 0.00 | 0.00  | 0.00 | 0.00 | 0.00 | 0.00  | 0.00 |

|      | 3TS   | 4TS   | 5TS   | 6TS    | 7TS    | 8TS    | 9TS    | 10TS   | 11TS   | 14TS   |
|------|-------|-------|-------|--------|--------|--------|--------|--------|--------|--------|
| 3TM  | 10.62 | 1.51  | -4.43 | -5.64  | -10.96 | -11.44 | -10.08 | -8.68  | -8.56  | 0.00   |
| 4TM  | 10.52 | 3.34  | -1.91 | -2.99  | -8.69  | -8.32  | -8.10  | -9.76  | -6.29  | -7.11  |
| 5TM  | 5.80  | -1.76 | -7.14 | -9.09  | -13.33 | -13.50 | -13.88 | -11.35 | -13.39 | -7.49  |
| 6TM  | 5.67  | -1.71 | -9.07 | -10.05 | -14.49 | -15.78 | -14.17 | -14.41 | -16.96 | -18.92 |
| 7TM  | 9.09  | 0.40  | -4.76 | -6.25  | -11.30 | -12.83 | -11.71 | -14.42 | -9.95  | -6.02  |
| 8TM  | 11.15 | 1.93  | -3.13 | -5.64  | -10.57 | -10.44 | -11.05 | -12.99 | -11.72 | -10.05 |
| 9TM  | 9.50  | 0.68  | -2.53 | -4.15  | -9.62  | -10.58 | -6.00  | -9.90  | -7.95  | -6.58  |
| 10TM | 10.50 | 0.97  | -5.65 | -4.45  | -7.66  | -15.00 | -5.14  | -3.98  | -17.13 | -7.00  |
| 11TM | 11.55 | 0.18  | -1.79 | -2.66  | 9.45   | -15.55 | 0.00   | 0.00   | 0.00   | -5.36  |
| 14TM | 0.00  | 5.43  | 0.00  | 0.00   | 0.00   | 0.00   | 0.00   | 0.00   | 0.00   | 0.00   |

OPTICAL DISC DEVICE

BACKGROUND OF THE INVENTION

1. Field of the Invention

The present invention relates to an optical disc device that can record information in an optical disc and reproduce recorded information from the optical disc, and a method for recording optical information.

This application claims the priority of Japanese Patent Application No. 2004-330992, filed on Nov. 15, 2004, and Japanese Patent Application No. 2005-219488, filed on Jul. 28, 2005, in the Japanese Patent Office, the disclosures of which are incorporated herein in their entirety as if fully set forth herein.

2. Description of the Related Art

A variety of writable optical recording media are commercially available which allow users to record large amounts of information. Examples include write once read memory (WORM) type optical discs, such as CD-R discs, and rewritable type optical discs, such as CD-RW discs. More recently, high-capacity digital video discs (e.g., DVD-R, DVD-RW and DVD-RAM) have been introduced as the result of the use of shorter wavelength laser beams, decreased spot diameters, and thin substrates. Generally, data is recorded in the form of non-reflective marks along a spiral track of the optical discs. Herein, the term "mark" refers to the pit, spot or region along the track in which data of a given logic value (e.g., "1") is recorded along the track. For example, the marks may be formed as non-translucent dye regions in the case of CD-R discs, or as amorphous regions in the case of CD-RW discs. The spaces located between the marks along the spiral track are often referred to as "lands". The lands are typically formed as translucent dye regions in the case of CD-R discs, and as polycrystalline regions in the case of CD-RW discs.

In order to avoid extended gaps (which can cause tracking problems) where there are no marks in the data track of a compact disc, data is typically encoded using "Eight to Fourteen Modulation" (EFM). In EFM, 8-bit bytes are converted to 14 bits, with at least some of the 14 bits being logic "1" (marks). However, variations in physical characteristics among optical discs can result in improper recording of the EFM signal. That is, mark formation failures can occur for a variety of reasons, such as variations in the composition of the dye recording layer of the optical disc, and heat accumulation of the recording media coupled with an insufficient cooling rate. In other words, the optical disk drive writer parameters that might be best suited for one optical disc may not be ideal for another optical disc.

As such, in an effort to improve write accuracy, a reference write pattern is used to determine and set optimal or preferred write parameters of an optical disc to be recorded in advance of a recording operation. Herein, the set write parameters associated with an optical disc are referred to as a "write strategy" of the optical disc. It is known that this write strategy is closely related with a number of factors, including recording rate, dye material, phase-change material, dye film thickness, track configuration, and so on.

The write strategy generally defines or sets a number of variable write conditions of the optical disc. For example, the mark-to-land ratio may be varied, an additional pulse may be added to the front end of a write pulse, the rise or fall position of the write pulse may be altered, a write pulse may be converted to a multi-pulse format, and so on.

By varying the mark-to-land ratio, it become possible to provide a good shape for the front end and rear end of the mark, which is generated by irradiating a short pulse onto the optical disc at a high recording power, by shortening the length of the mark during a low speed recording operation.

Adding an additional pulse to the front end of a recording pulse enhances the shape of the front end, which is formed by additively applying a recording power to the front end of the pit that is difficult to deform by heat of laser.

Changing the rise or fall position of a pulse by a combination of the mark and land can make uniform the length of the mark and land, which are formed by changing the position of the front end of the land according to the length of the rear land because the heat used to form any mark influences the next mark, the position of any land is changed or heat of the recording mark is transferred to the front end according to the length of a front land, a rear position of a mark is changed or heat of a rear mark is transferred to a rear land to influence the rear land according to the length of the recording mark.

The method of converting a recording pulse into a multi-pulse is mainly used for the phase change disc, such as CD-RW, or DVD. When recording information in a phase change disc using a successive pulse, heat generated during the recording operation erases the front end of the recorded information. To solve the above erase problem, a multi-pulse having a cooling period between marks is used.

Also, since there exist in the market so many kinds of optical discs, it is impossible to prepare a proper write strategy in advance for all optical discs in the market.

Due to the above problem, a method of recording information while varying a write strategy into two or more tracks in an optical disc area and selecting a write strategy for which reproduction jitter is minimized (e.g., Japanese Patent Publication No. 2000-30254), or a method of recording information using a specific record pattern and obtaining a combination of a mark and a land by which a jitter value or a deviation value is minimized (e.g., Japanese Patent Publication No. 2003-30837), is proposed.

However, in the method disclosed in Japanese Patent Publication No. 2000-30254, a finally selected write strategy is only the best write strategy among the predetermined set of write strategies, and is not the optimal write strategy for an optical disc in use. In addition, the above method is problematic in that tracks are used as a record area necessary for a test.

Also, in the method disclosed in Japanese Patent Publication No. 2003-30837, since a particular record pattern is used and the influence on a mark or a land other than when changing that particular mark or land (e.g., when changing a previous mark or land) is not sufficiently considered, it is very difficult to set an optimal write strategy for an optical disc in use.

SUMMARY OF THE INVENTION

Exemplary embodiments of the present invention provide an optical disc, a method for recording optical information, and a program that substantially obviate one or more problems due to limitations and disadvantages of the related art.

Exemplary embodiments of the present invention provide an optical disc device, and a method for recording optical information that can set a write strategy optimal for a disc in use and having a high preciseness within a short time period without using a special recording pattern.

An embodiment of the present invention provides an optical disc device for recording and reproducing information by forming marks and lands in an optical information recording medium, the optical disc device comprising: measuring means for measuring lengths of the marks and lands recorded using a reference write strategy and an alternative write strategy in which at least one parameter is varied in two or more combinations of marks and lands with respect to the reference write strategy; measurement results memory for storing a result of the measuring means; theoretical length memory for storing theoretical lengths of the respective marks and lands; deviation value computing means for computing a deviation value of each of the marks and lands by shifting the write strategy on the basis of the lengths of the marks and lands stored in the measurement results memory and the lengths of the mark and lands stored in the theoretical length memory; contractile rate computing means for computing inherent contractile rates of all marks and lands from the computed deviation value and a probability of occurrence of each of the marks and lands; variance computing means for computing a variance of the deviations by the combination of each of the marks and lands from the computed deviation value of each of the marks and lands; and write strategy setting means for setting the write strategy using the computed inherent contractile rates of all the marks and lands such that the computed variance is minimized.

Another embodiment of the present invention provides an optical disc device for recording and reproducing information by forming marks and lands in an optical information recording medium, the optical disc device comprising: measuring means for measuring a length of each of the marks and lands recorded using a reference write strategy and an alternative write strategy in which at least one parameter is varied in two or more combinations of marks and lands with respect to the reference write strategy; measurement results memory for storing a result of the measuring means; theoretical length memory for storing theoretical lengths of the respective marks and lands; deviation value computing means for computing a deviation value of each of the marks and lands by shifting the write strategy on the basis of the lengths of the marks and lands stored in the measurement results memory and the lengths of the mark and lands stored in the theoretical length memory; contractile rate computing means for computing inherent contractile rates of all marks and lands from the computed deviation value and a probability of occurrence of each of the marks and lands; difference value computing means for computing difference values of the deviations by the combination of each of the marks and lands from the computed deviation value of each of the marks and lands; and write strategy setting means for setting the write strategy using the computed inherent contractile rates of all the marks and lands such that the computed difference values are less than a set value.

Still another embodiment of the present invention provides a method for recording and reproducing information by forming marks and lands in an optical information recording medium, the method comprising: measuring a length of each of the marks and lands recorded using a reference write strategy and an alternative write strategy in which at least one parameter is varied in two or more combinations of marks and lands with respect to the reference write strategy; storing a measured result of the length of each of the marks and lands; storing a theoretical length of each of the marks and lands; computing a deviation value of each of the marks and lands by shifting the write strategy on the basis of the measured lengths of the marks and lands and the theoretical lengths of the marks and lands; computing inherent contractile rates of all marks and lands from the computed deviation value and a probability of occurrence of each of the marks and lands; computing a variance of the deviations by the combination of each of the marks and lands from the computed deviation value of each of the marks and lands; and setting the write strategy using the computed inherent contractile rates of all the marks and lands such that the computed variance is minimized.

Yet another embodiment of the present invention provides a method for recording and reproducing information by forming marks and lands in an optical information recording medium, the method comprising: measuring a length of each of the marks and lands recorded using a reference write strategy and an alternative write strategy in which at least one parameter is varied in two or more combinations of marks and lands with respect to the reference write strategy; storing a measured result of the length of each of the marks and lands; storing a theoretical length of each of the marks and lands; computing a deviation value of each of the marks and lands by shifting the write strategy on the basis of the measured lengths of the marks and lands and the theoretical lengths of the marks and lands; computing inherent contractile rates of all marks and lands from the computed deviation value and a probability of occurrence of each of the marks and lands; computing a difference value of the deviations by the combination of each of the marks and lands from the computed deviation value of each of the marks and lands; and setting the write strategy using the computed inherent contractile rates of all the marks and lands such that the computed difference value is minimized.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 3A to 3C are tables showing examples of required deviations;

FIG. 5 is a table showing an adjustment order for obtaining an optimal write strategy;

FIG. 6 is a table showing deviations of a mark located before a land;

FIG. 7 is a table showing deviations of a mark located after a land;

FIG. 14 is a table showing deviations of marks located before lands;

FIG. 15 is a table showing deviations of lands located after marks;

DETAILED DESCRIPTION

Prior to describing the method of recording optical information in an optical disc device related with embodiments of the present invention, other method of recording optical information will now be described with reference to FIGS. 2 to 5.

Figure 2:
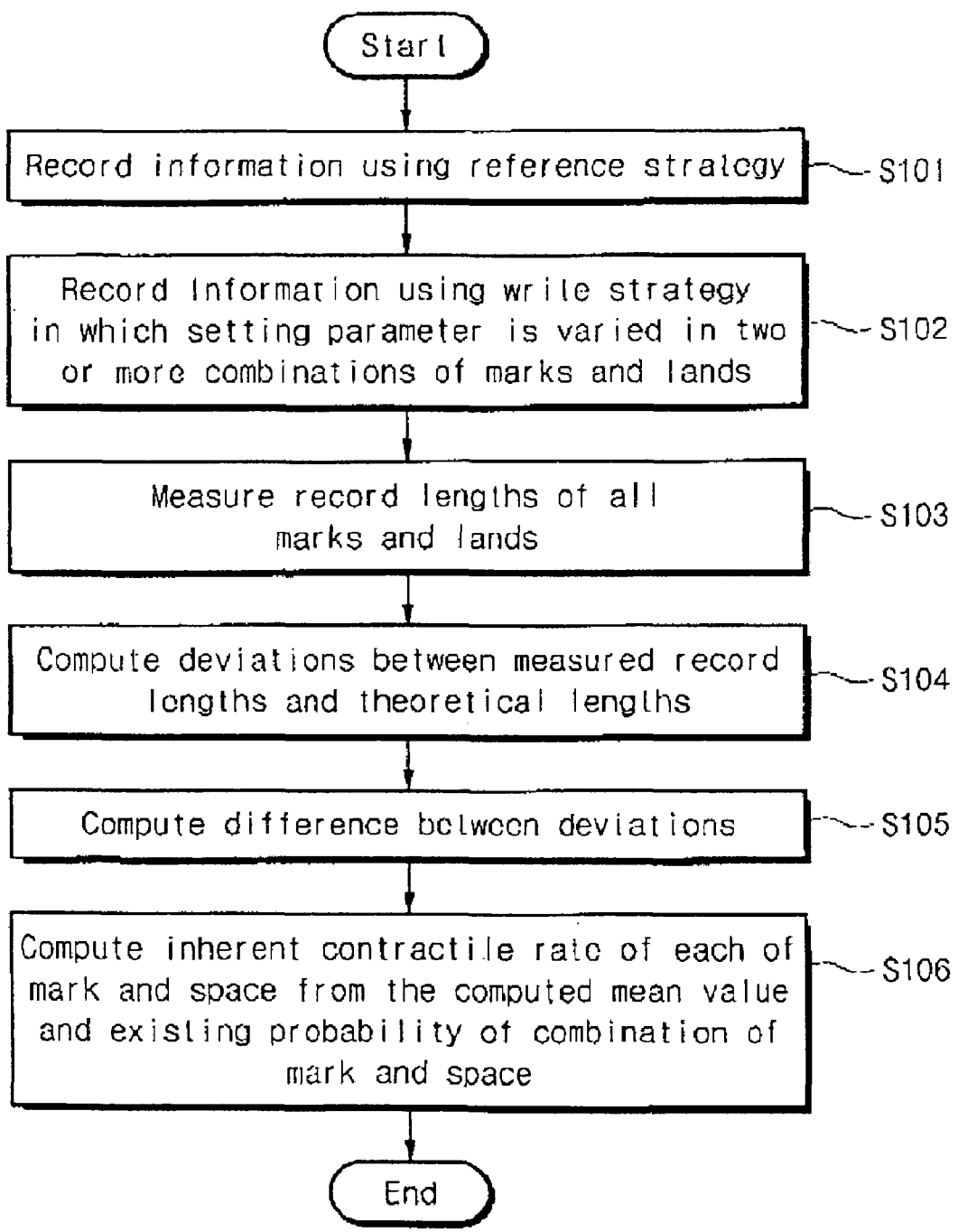
FIG. 2 is a flow chart showing a method of obtaining an inherent contractile rate.

FIG. 2 is a flow chart illustrating a method of setting a write strategy where information is recorded in a CD-R/RW. In FIG. 2, a control part sets a reference write strategy stored in a recording part in a record pulse series correction part and performs a recording operation (S 101). Next, a recording operation is performed using a write strategy which has a high influence on another mark and land, can set 3T to 5T marks located before 3T to 5T lands as a write strategy and is extended by an integer times as large as a minimal resolution, with respect to the reference write strategy (S102). Also, considering a later processing, the extension amount is preferred to be a minimal resolution, but considering that the minimal resolution is a very small value, it is preferable that the write strategy be an integer times as large as the minimal resolution to decrease the influence of an error.

After the respective recording operations are completed, the recorded signals are respectively reproduced. During the reproducing operation, a record length detection part measures record lengths in all the combinations of marks and lands, and stores a measurement result of each write strategy in a storing part (memory) (S103).

The control part computes a deviation (see FIG. 3A) between the record length as recorded with the reference write strategy stored in the storing part and a theoretical length in all of combinations of marks and lands stored in the storing part (memory). The control port also computes a deviation (see FIG. 3B) between the record length as recorded by the write strategy which extends the marks and lands by an integer multiple of the minimal resolution predetermined mark and land, and the theoretical length in all of the combinations of marks and lands (S104). When the extension amount of 3T to 5T marks located before 3T to 5T lands is an integer times as large as the minimal resolution, the obtained difference is again divided by the integer to obtain a deviation value for the minimal resolution. The control part also computes a difference (see FIG. 3C) between the deviations produced by the two different write strategies (S105).

In order to compute the inherent contractile rate of each mark and land from the deviation values shown in FIG. 3C, an existing probability due to the combination of each of the marks and lands is used. For example, noting the row of 3TP of FIG. 3C, the inherent contractile rate due to the combination of a 3T mark and a 3T land subtracted by the influence due to variations of other marks and lands corresponds to the deviation value in the combination of a 3T mark and a 3T land. Accordingly, assuming that the inherent contractile rates in the combinations of a 3T mark with a 3T land, a 4T land and a 5T land respectively are $\Delta T(3, 3)$, $\Delta T(4, 3)$, and $\Delta T(5, 3)$, and the deviation value between a 3T mark and a 3T land is A, the following relationship therebetween is obtained:

$$\Delta T(3,3) - \Delta T(4,3) \times R(4,3)/(1-R(4,3)) - \Delta T(5,3) \times R(5,3)/(1-R(5,3)) - \ldots - \Delta T(5,5) \times R(5,5)/(1-R(5,5)) = A. \quad (1)$$

Meanwhile, noting the region bounded by the bold line of FIG. 3C, in the combination where 6T mark or 6T land is included, even though 6T mark or 6T land is not changed, there exists an almost same deviation between the combinations. This deviation is an essence of an influence by changing the lengths of 3T marks to 5T marks before 3T lands to 5T lands.

Accordingly, assuming that a deviation value between a 3T mark and a 6T land is Z, the deviation value is expressed by equation 2:

$$Z = \Delta T(3, 3) \times R(3, 3)/(1 - R(3, 3)) + \quad (2)$$
$$\Delta T(4, 3) \times R(4, 3)/(1 - R(4, 3) + \Delta T(5, 3) \times R(5, 3)/$$
$$(1 - R(5, 3), + \ldots + \Delta T(5, 5) \times R(5, 5)/(1 - R(5, 5))$$

where R(i, j) is the probability of occurrence of an iT mark followed by a jT land.

By substituting the equation 2 for the equation 1, equation 3 can be obtained.

$$\Delta T(3,3) = (Z+A)(1-R(3,3)). \quad (3)$$

Again by substituting the values of FIG. 3C for the term of (Z+A) of the equation 3, equation 4 can be obtained:

$$\Delta T(3,3) = (-2.4-7.7) \times (1-R(3,3))$$
$$\Delta T(3,4) = (-2.0-7.7) \times (1-R(3,4))$$
$$\Delta T(3,5) = (-0.7-7.7) \times (1-R(3,5))$$
$$\Delta T(5,5) = (-9.6-7.7) \times (1-R(5,5)). \quad (4)$$

Since the probability of occurrence of each of the combinations of marks and lands is known, the inherent contractile rate in each of the combinations of marks and lands can be obtained by using the above relationships (S105).

According to the present embodiment method of computing a correction value, when information is recorded by the reference write strategy, a write strategy of using the inherent contractile rate corresponding to the foregoing minimal resolution is suppressed below the minimal resolution, thereby setting an optimal write strategy.

Also, the method is characterized in that a final value of the correction values of all marks and lands is processed in the order of the highest probability of occurrence. In other words, if the combination of mark and land having a high probability of occurrence is adjusted (see the processing flow of FIG. 5), it greatly influences other combinations of marks and lands. So, by performing such a processing, it is possible to collect the respective correction values in a short time period.

Figure 4:
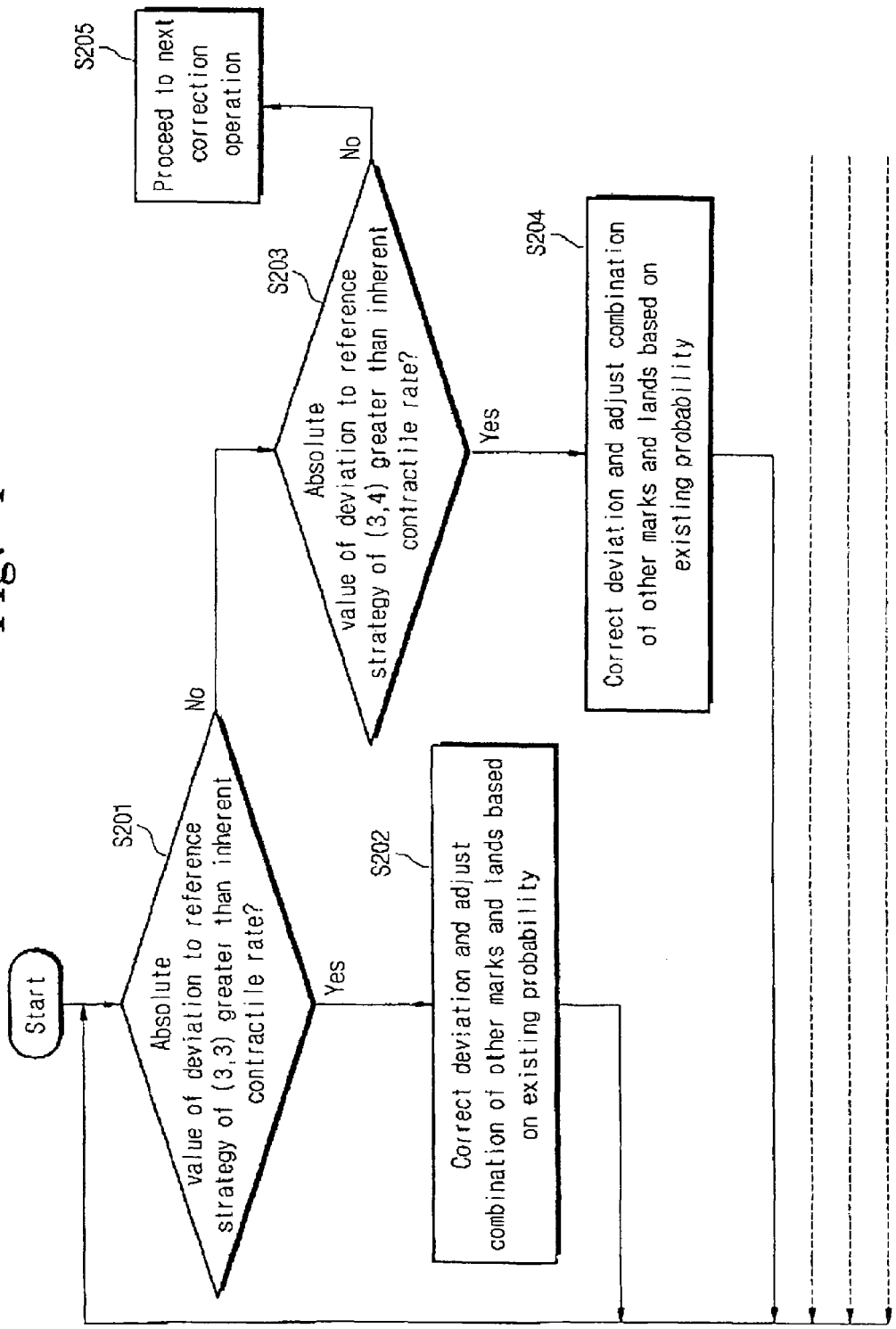
FIG. 4 is a flow chart showing a method for obtaining an optimal write strategy.

In particular, as shown in FIG. 4, it is determined whether or not an absolute value of a deviation with respect to the reference write strategy is greater than the inherent contractile rate in the combination of a 3T mark and 3T land having the highest existing probability (S201). As a result of that step, when the absolute value of the deviation with respect to the reference write strategy is greater than the inherent contractile value, the deviation is corrected and the deviation for other combinations of mark and land are adjusted based on the existing probability (S202).

Meanwhile, when the absolute value of the deviation with respect to the reference write strategy is smaller than the inherent contractile value, an adjustment of a combination of a 3T mark and a 3T land having the next highest probability of occurrence is performed (S203). The adjustment to the combination of a 3T mark and a 3T land having the next highest probability of occurrence is performed the same as the adjustment to the combination of the 3T mark and the 3T land having the highest probability of occurrence (S203, S204), and such an adjustment is likewise performed to the combinations up to the combination of an 11T mark and 11T land (S205).

According to the foregoing method, it is possible to set an optimal write strategy considering the influence of other marks and lands. However, in this method, the deviation of each mark and land is solely adjusted to zero to improve the record quality, which results in a great effect in the improvement of record quality of only the mark or only the land. However, in a real situation, it is important to accomplish a balanced improvement of the record quality of the mark and land. So, in the arrangements described below, it is intended to set an optimal write strategy from the above viewpoint.

Figure 1:
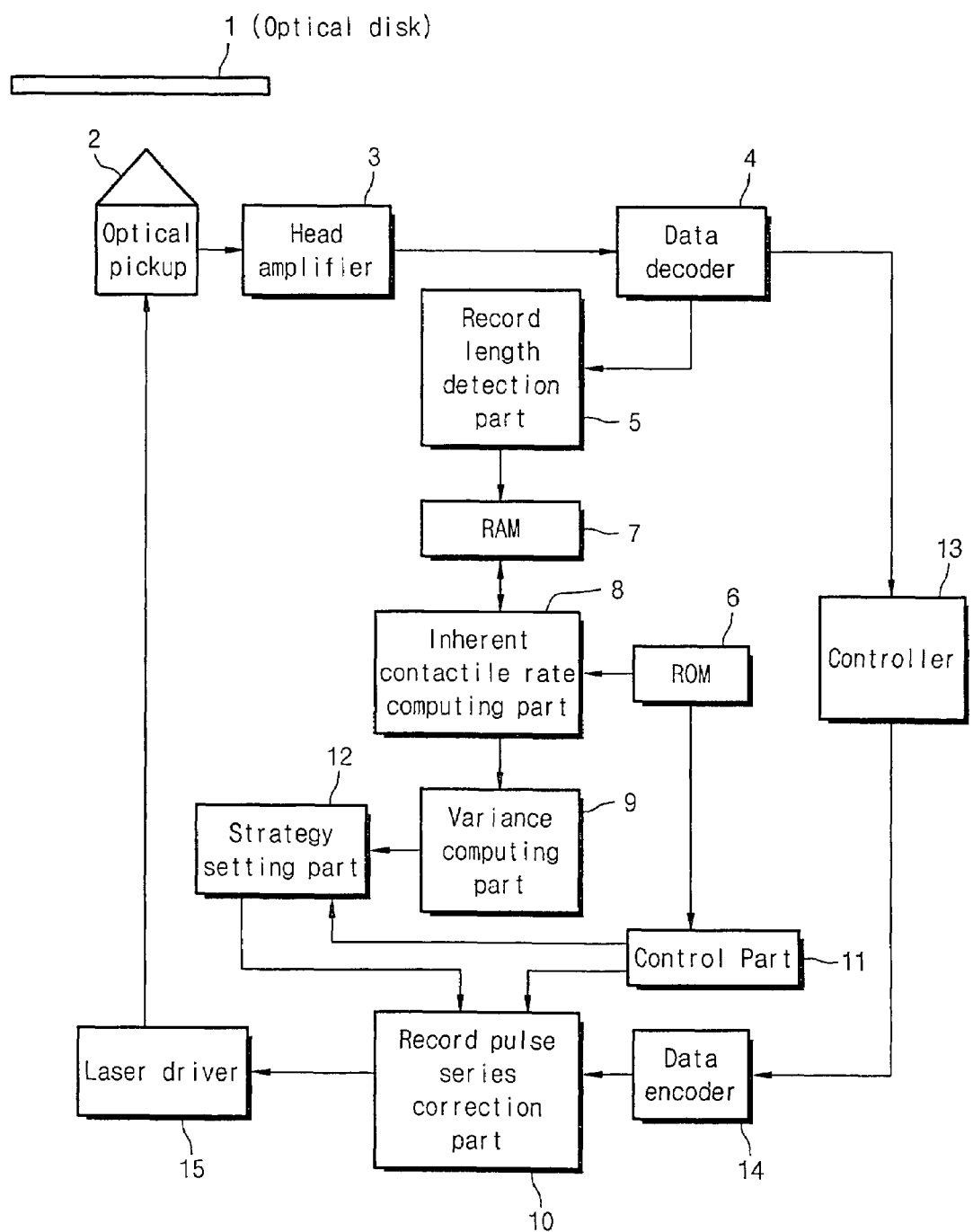
FIG. 1 is a block diagram of an optical disc device.

FIG. 1 is a functional block diagram of one embodiment of an optical disc device. Referring to FIG. 1, the optical disc device includes an optical disc 1, an optical pickup 2, a head amplifier 3, a data decoder 4, a record length detection part (or measuring means) 5, a read only memory (ROM) (or theoretical length storage means) 6, a random access memory (RAM) (or measured value storage means) 7, an inherent contractile rate computing part (or inherent contractile rate computing means) 8, a variance computing part (or variance computing means) 9, a record pulse series computing part (or recording means) 10, a control part (or difference value computing means or deviation computing means) 11, a strategy setting part (write strategy setting means) 12, a controller 13, a data encoder 14, and a laser driver 15. Hereinbelow, the deviation is often referred to as a difference between strategies that can be obtained from a signal recorded and reproduced and having different mark lengths, and the inherent contractile rate is often referred to as an amount deviated from the inherent theoretical length of the mark.

In the example of this embodiment, the optical disc 1 is an optical information recording medium that is responsive to a semiconductor laser to record, reproduce and erase information. Examples may include CD-Rs, CD-RWs, DVD Rs, DVD RWs, and DVD-RAMs.

The optical pickup 2 is used to record and reproduce information on the optical disc 1. Although not shown, the optical pickup 2 of this example includes a laser beam source such as a laser diode, a collimator lens, an objective lens driven by a focus actuator or a tracking actuator, optical elements such as a polarization beam splitter or a cylindrical lens, a four-section photo-detector (PD) having four separate areas A, B, C and D that convert incident light into electrical signals, a two-section photo-detector, and a front monitor diode for monitoring a laser output during recording or reproducing operations.

The head amplifier 3 is coupled to the optical pickup 2 so as to generate an RF signal corresponding to the amount (intensity) of the light reflected from the respective areas tracked by the four-section PD. The RF signal is output to the data decoder 4. In addition, the head amplifier 3 substantially simultaneously generates a focus error signal, i.e., a signal corresponding to a focus difference of the laser beams irradiated by the optical pickup 2, using astigmatism, and generates a tracking error signal, which corresponds to a signal detecting a direct deviation of the irradiation laser of the optical pickup 2.

The data decoder 4 generates an EFM signal from the RF signal generated by the head amp 3, converts the generated EFM signal into a signal of a desired format, and outputs the converted EFM signal to the controller 13.

The record length detection part 5 receives the EFM signal from the data decoder 4 and measures a pulse width of the EFM signal using a time measuring circuit (not shown). In the present embodiment, the mark length and land length in a combination of each mark and land is measured from information recorded using a write strategy in which a certain mark length or a certain land length is individually changed by a predetermined amount with respect to the reference write strategy.

ROM 6 is a non-rewritable storage unit and stores a control program for controlling all parts of the optical disc device. In addition, the ROM 6 stores a reference write strategy, theoretical lengths of the marks and lands, and the probabilities of occurrence of the various combinations of marks and lands.

RAM 7 is a rewritable storage unit and temporarily stores a correction amount in each optical disc, a measurement result of the input record length from the record length detection part 5, a deviation value between the measurement value of the record length and the theoretical lengths of the mark and land, the inherent contractile rate of the mark and land, and the like.

The inherent contractile rate computing part 8 computes the inherent contractile rate of each mark from the measurement value of the record length stored in RAM 7 and the theoretical lengths of the mark and land.

The variance computing part 9 computes a variation rate of the inherent contractile rate when information is recorded using a variety of write strategies from the inherent contractile rate computed by the inherent contractile rate computing part 8, and thereby computes the variance in the combination of the mark and land on the basis of a predetermined arithmetic equation.

The record pulse series correction part 10 generates a record pulse series on the basis of an input write strategy or an input parameter from the control part 11 or the strategy setting part 12 and outputs the generated record pulse series to the laser driver 15.

The control part 11 controls the whole operations of the optical disc device including information recording and reproducing according to the control program. In the present embodiment, the control part 11 has a further function to output the data stored in RAM 7 to the inherent contractile rate computing part 8.

The strategy setting part 12 sets a write strategy of which the lengths of the mark and land come to have a predetermined value, on the basis of the inherent contractile rate of the mark and land obtained from the inherent contractile computing part 8, and outputs the set write strategy to the record pulse series correction part 10.

The controller 13 provides the data encoder 14 with a record signal and also reads the record signal from the data decoder 4.

The data encoder 14 converts the record signal provided from the controller 13 into EFM signal or the like and outputs the converted EFM signal to the record pulse column correction part 10.

The laser driver 15 generates a pulse signal for driving the laser diode according to the input record pulse and provides a semiconductor laser (not shown) of the optical pickup 2 with the same.

Next, a method for setting a write strategy for an optical disc according to the present invention will be described with reference to FIGS. 6 through 17.

The methods for setting a write strategy by a combination of the mark and land may include a method for setting a write strategy using a jitter value obtained in CD-Rs/RWs after the write strategy is changed by a computing procedure. Unlike in CDs, in DVDs, since the jitter value is not for a particular T but for all Ts, it is necessary to perform the computation of the jitter value on marks of 6T or longer, having a small number of samples. However, it is a problem that the small number of samples abruptly deteriorates the precision. Accordingly, the method using the jitter value is effective in CDs, but is not necessarily effective for DVDs. So, the following two methods applicable to all optical recording media are proposed.

The first method is one to set a balancing write strategy with respect to the mark and land. Specifically, assuming that the land is located behind the mark, i.e., the mark is located before the land, the deviation table of FIG. 6 is provided. On the other hand, when the mark is located behind the land, the deviation table of FIG. 7 is provided. In these tables, 3TM indicates a 3T mark and 3TS indicates a 3T land. Also, by assigning the mark values and the land values of the tables to variables X and Y of a two dimensional coordinate systems, respectively, the graph of FIG. 8 can be obtained.

Figure 8:
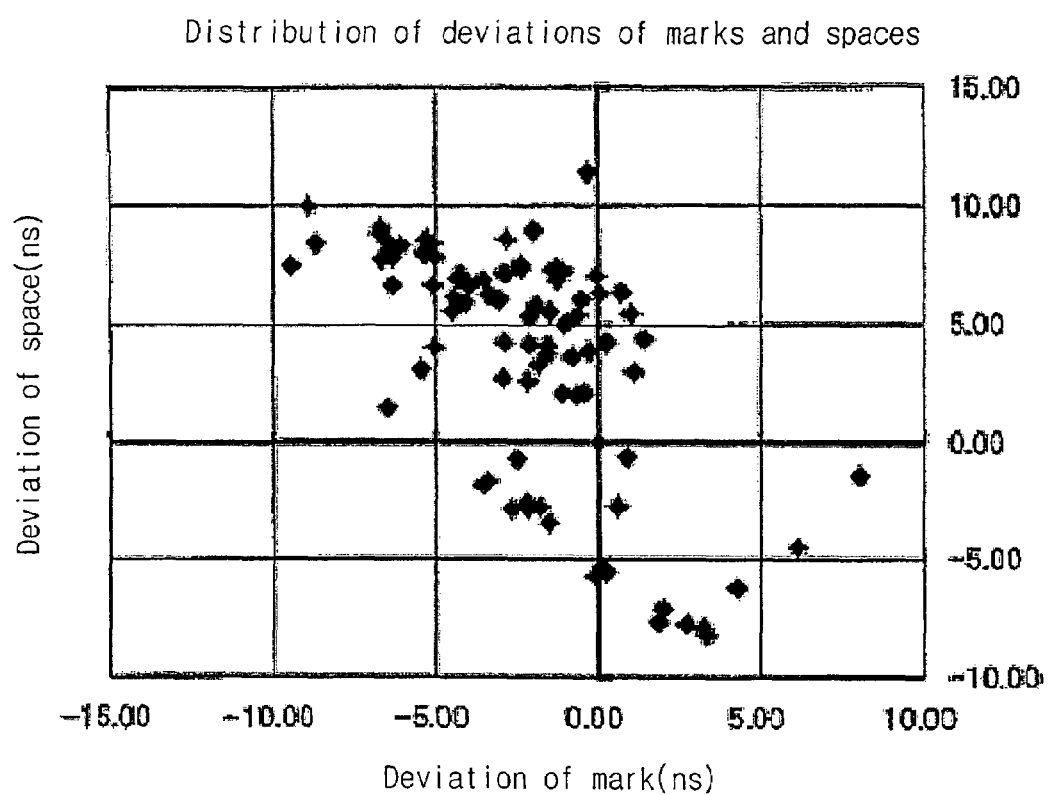
FIG. 8 is a graph showing a plot of deviations in a combination of mark and land in two-dimensional coordinates.
Figure 9:
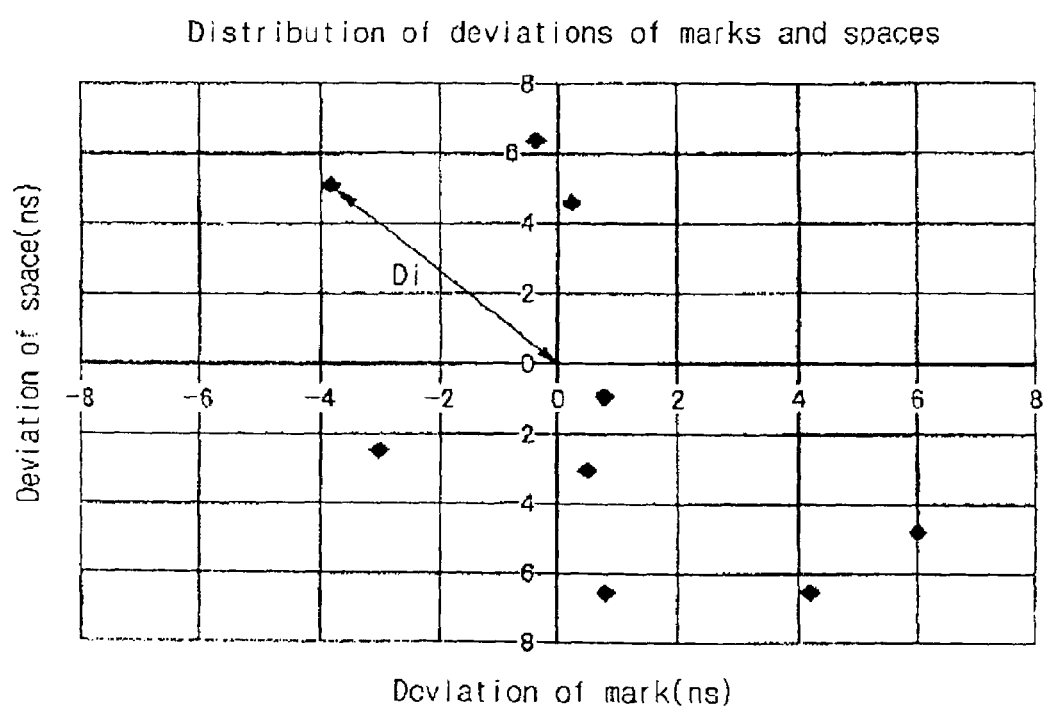
FIG. 9 is a graph showing weighted average values for marks of 5T or longer.

However, since the plotted points are too many in FIG. 8, the analysis for the plotted points is complicated. Accordingly, by weight-averaging the points of 5T marks and longer marks, having a low probability of occurrence, the graph of FIG. 9 is obtained. In FIG. 9, a distance 'Di' between the plotted points and the origin is considered to be an average deviation of the mark and land. When defining a total sum of values obtained by multiplying a power of the obtained distance (Di) with the probability of occurrence of the plotted marks and lands as a variance (K) of deviations (see equation 5), a write strategy where the deviation variance is a minimum becomes an optimal strategy. In addition, in equation 5, K is the deviation variance, Di is a distance between each point and the origin, and Ri is the probability of occurrence of each point.

$$K = \sum_{i=3}^{14} (Di^2 \times R_i). \quad (5)$$

Figure 10:
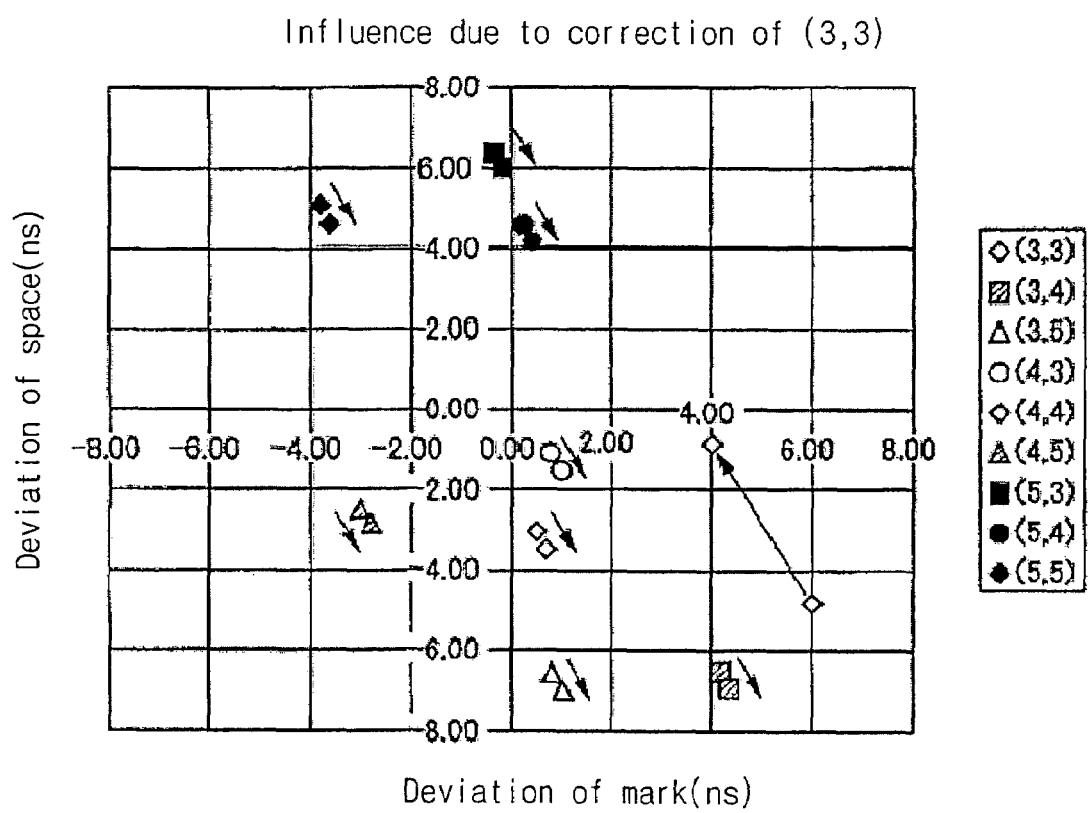
FIG. 10 is a graph showing an influence of the mark-land values of FIG. 9 when deviations of a 3T land-3T mark are shifted.
Figure 11A:
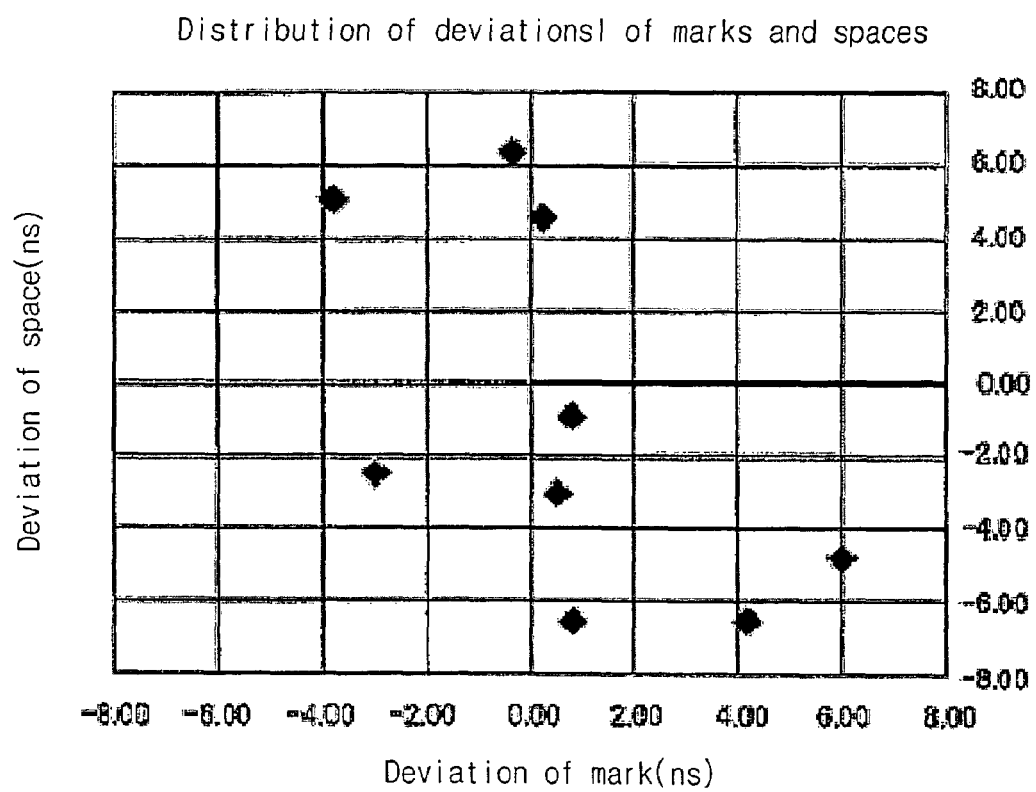
FIGS. 11A and 11B are graphs showing a deviation distribution of each mark-land in (A) an initial state and (B) after the deviation is adjusted.
Figure 11B:
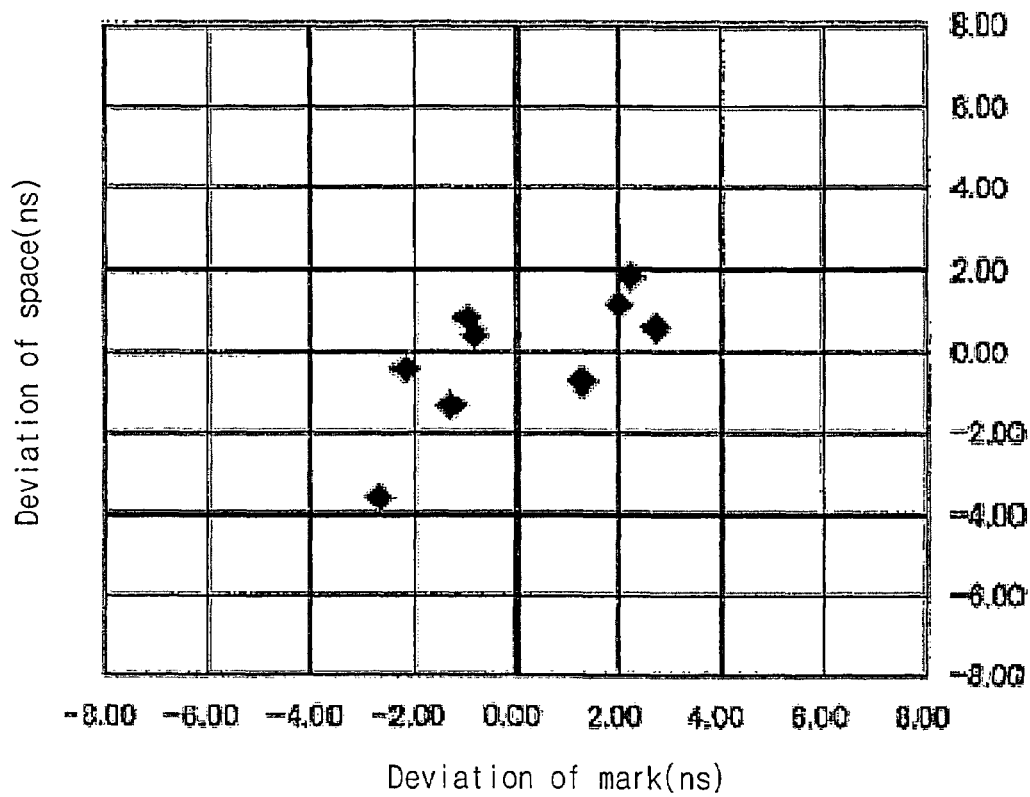

In FIG. 9, by varying the write strategy of the point corresponding to the combination of a 3T mark and 3T land (i.e., point (3, 3)) by a minimum resolution, the total distribution is varied as shown in FIG. 10. Also, it is well known that together with the movement of (3, 3), the remaining points are moved in an opposite direction to the movement direction of (3, 3). By repeating the above manipulation using such a characteristic, it is possible to concentrate all the points near the origin, i.e., it is possible to minimize the variance (K) of deviations. In the real circumstance, if the write strategy is set using the above method, the results shown in FIG. 11 are obtained. FIG. 11A shows an initial state and FIG. 11B shows a state after the manipulation.

Figure 12:
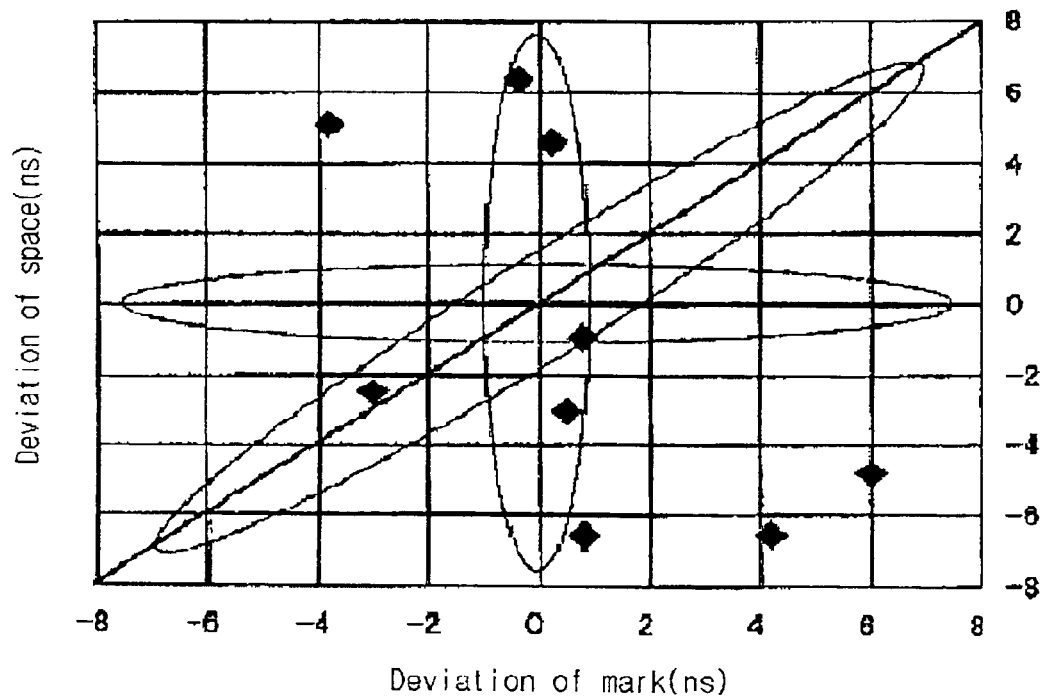
FIG. 12 is a graph showing a deviation distribution of each mark-land targeted for a setting.

Heretofore, the setting of the write strategy based on the empirical method has needed a determination of whether the mark or the land is targeted. This corresponds to the points on the coordinate axis being concentrated on the X-axis or Y-axis, but the minimization of the variance (K) of deviations corresponds to the concentration of points on the coordinate axis on Y=X as shown in FIG. 12.

Figure 13A:
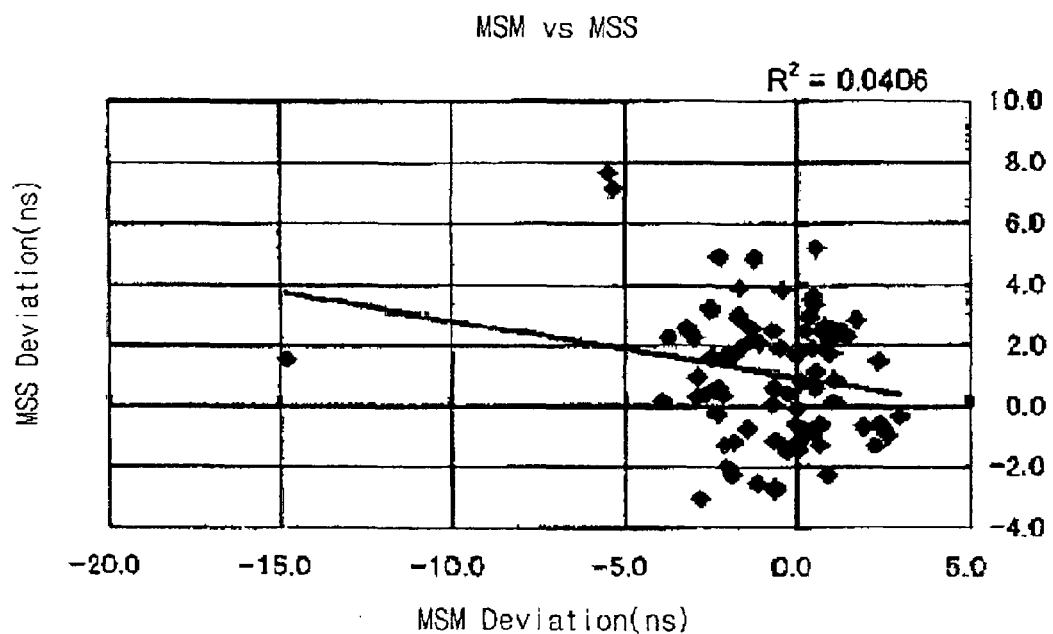
FIGS. 13A and 13B are graphs showing a difference in an initial distribution.
Figure 13B:
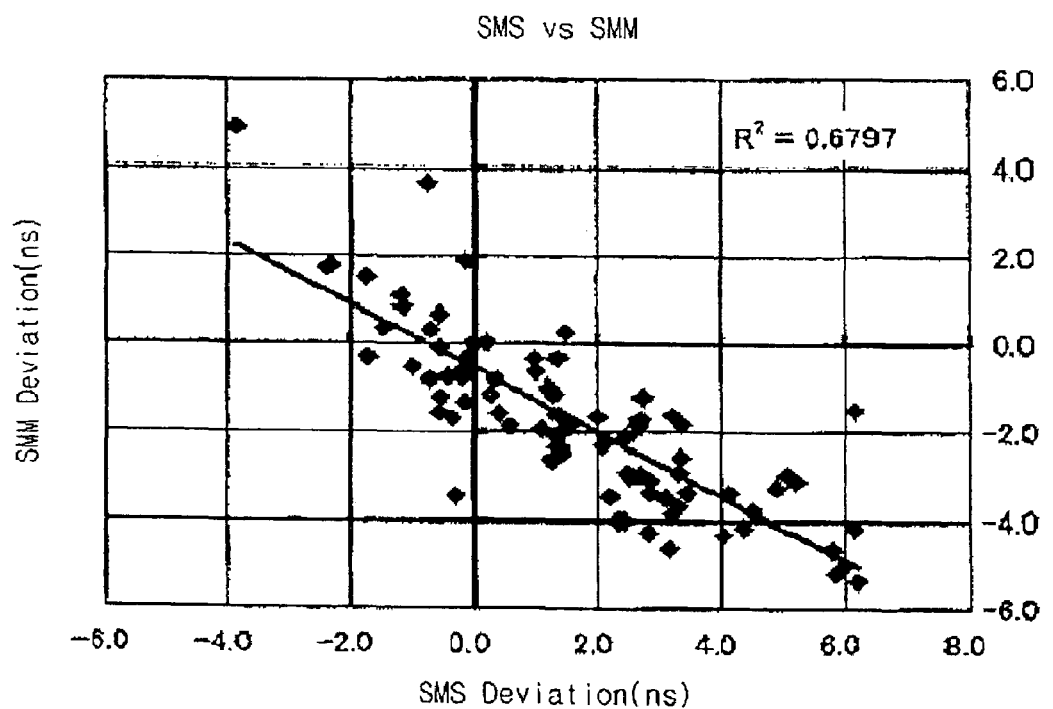

Further, in using the above technique, it is necessary to determine whether the edge of the mark-land transition, or the edge of the land-mark transition, is adjusted. In standards for judgment, in order to finally concentrate the points near the origin, it is preferable that as an initial distribution state, these points be concentrated on Y=−X. In FIG. 13, SMS deviation represents the deviation of the land in the case of land-mark, SMM deviation represents the deviation of the mark in the case of land-mark, MSM deviation represents the deviation of the mark in the case of mark-land, and MSS deviation represents the deviation of the land in the case of mark-land. In the example of FIG. 13, since the SMS vs. SMM is larger in square mean of R than MSM vs. MSS (the square mean of SMS vs. SMM is 0.6797 and the square mean of MSM vs. MSS is 0.0406), the points on the coordinate axis are concentrated on Y=−X. Accordingly, the example of FIG. 13 shows that the edge of the land-mark transition having the larger square mean of R should be selected.

Meanwhile, the second method is a refinement of the first method. As described above, according to the first method, it is possible to set an optimal write strategy balanced between the marks and lands. However, the first method requires so much computation that the load on the software is increased. Accordingly, the second method is to provide an equivalent write strategy to the first method while decreasing the load on the software.

In the first method, it is described that when all the marks and lands existing on the two-dimensional coordinate system are concentrated on Y=X, the variance is minimized. The second method is to achieve the above object while following the first method.

Figures 16, 17:
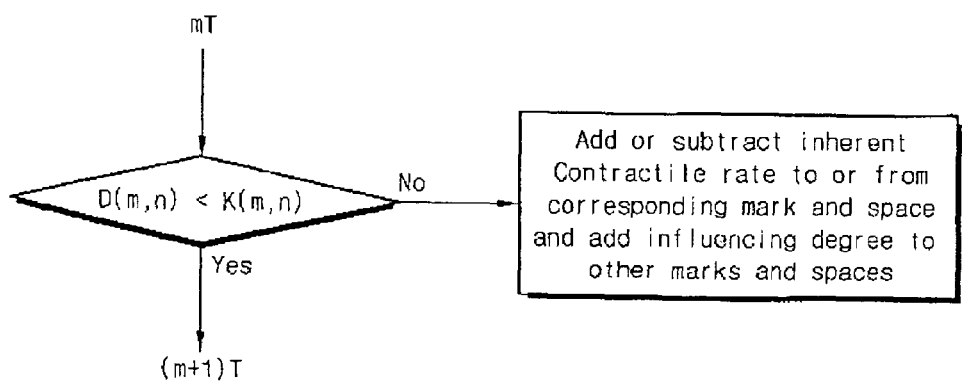
FIG. 16 is a table showing a difference between deviations.
FIG. 17 is a flow chart showing a method for a setting of strategy.

Referring to FIGS. 14 and 15, in a combination that nT land is located behind mT mark, deviations of the marks and lands are defined as DM(m, n) and DS(m, n). Differences between the corresponding values of FIGS. 14 and 15 are obtained as shown in FIG. 16. When each element shown in the table of FIG. 16 is defined as D(m, n), D(m, n) is expressed by equation (6):

$$D(m,n)=DM(m,n)-DS(m,n). \quad (6)$$

The deviation data of all the marks and lands existing on the two-dimensional coordinate system being concentrated on Y=X in the first method corresponds to each element D(m, n) of the table of FIG. 16 converging to zero (0). When assuming that the inherent contractile rate of the mark is KM(m, n) and the inherent contractile rate of the land is KS(m, n), the mean inherent contractile rate K(m, n) is expressed by equation (7):

$$K(m,n)=(KM(m,n)+KS(m,n))/2. \quad (7)$$

Accordingly, the mean inherent contractile rate is computed using D(m, n) and K(m, n) as shown in FIG. 17. In other words, it is determined whether D(m, n) is smaller than K(m, n) with respect to the mark and land. Next, when D(m, n) is larger than K(m, n), the corresponding inherent contractile rate is added to or subtracted from the mark or the land.

For example, if the inherent contractile rate is added to the mark, the inherent contractile rate is subtracted from the land adjacent to the mark. Also, since the manipulation of a certain mark or land influences other marks or lands, the influence degree on such a manipulation is added to the other mark or land. In addition, if the influence degree is added to any mark, the land adjacent to the mark is subject to a process that the influence degree is subtracted. Meanwhile, if D(m, n) is smaller than K(m, n) with respect to a certain mark or land, the same process is performed with respect to a certain mark or land located next to the previous mark or land.

According to the above method, an optimal write strategy can be set within a short time period without performing a vast computations, unlike the conventional art. Also, the method of setting a write strategy applicable regardless of the types of the optical recording media can be provided.

According to the present invention, an optimal write strategy can be set in which the influence on a mark or t land of any other mark or land is considered without using a particular recording pattern.

Also, the present invention is applicable regardless of the types of the optical recording media, and in particular, DVD±R/RW is used after the width and shift amount of a certain mark are set, thereby enabling the write strategy to be more precisely set.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical disc device for recording and reproducing information by forming marks and lands in an optical information recording medium, the optical disc device comprising:
    measuring means for measuring lengths of the marks and lands recorded using a reference write strategy and an alternative write strategy in which at least one parameter is varied in two or more combinations of marks and lands with respect to the reference write strategy;
    measurement results memory for storing a result of the measuring means;
    theoretical length memory for storing theoretical lengths of the respective marks and lands;
    deviation value computing means for computing a deviation value of each of the marks and lands by shifting the write strategy on the basis of the lengths of the marks and lands stored in the measurement results memory and the lengths of the mark and lands stored in the theoretical length memory;
    contractile rate computing means for computing inherent contractile rates of all marks and lands from the computed deviation value and a probability of occurrence of each of the marks and lands;
    variance computing means for computing a variance of the deviations by the combination of each of the marks and lands from the computed deviation value of each of the marks and lands; and
    write strategy setting means for setting the write strategy using the computed inherent contractile rates of all the marks and lands such that the computed variance is minimized.

2. An optical disc device for recording and reproducing information by forming marks and lands in an optical information recording medium, the optical disc device comprising:
    measuring means for measuring a length of each of the marks and lands recorded using a reference write strategy and an alternative write strategy in which at least one parameter is varied in two or more combinations of marks and lands with respect to the reference write strategy;
    measurement results memory for storing a result of the measuring means;
    theoretical length memory for storing theoretical lengths of the respective marks and lands;
    deviation value computing means for computing a deviation value of each of the marks and lands by shifting the write strategy on the basis of the lengths of the marks and lands stored in the measurement results memory and the lengths of the mark and lands stored in the theoretical length memory;
    contractile rate computing means for computing inherent contractile rates of all marks and lands from the computed deviation value and a probability of occurrence of each of the marks and lands;
    difference value computing means for computing difference values of the deviations by the combination of each of the marks and lands from the computed deviation value of each of the marks and lands; and
    write strategy setting means for setting the write strategy using the computed inherent contractile rates of all the marks and lands such that the computed difference values are less than a set value.

3. A method for recording and reproducing information by forming marks and lands in an optical information recording medium, the method comprising:
    measuring a length of each of the marks and lands recorded using a reference write strategy and an alternative write strategy in which at least one parameter is varied in two or more combinations of marks and lands with respect to the reference write strategy;
    storing a measured result of the length of each of the marks and lands;
    storing a theoretical length of each of the marks and lands;
    computing a deviation value of each of the marks and lands by shifting the write strategy on the basis of the measured lengths of the marks and lands and the theoretical lengths of the marks and lands;
    computing inherent contractile rates of all marks and lands from the computed deviation value and a probability of occurrence of each of the marks and lands;
    computing a variance of the deviations by the combination of each of the marks and lands from the computed deviation value of each of the marks and lands; and
    setting the write strategy using the computed inherent contractile rates of all the marks and lands such that the computed variance is minimized.

4. A method for recording and reproducing information by forming marks and lands in an optical information recording medium, the method comprising:
    measuring a length of each of the marks and lands recorded using a reference write strategy and an alternative write strategy in which at least one parameter is varied in two or more combinations of marks and lands with respect to the reference write strategy;
    storing a measured result of the length of each of the marks and lands;
    storing a theoretical length of each of the marks and lands;
    computing a deviation value of each of the marks and lands by shifting the write strategy on the basis of the measured lengths of the marks and lands and the theoretical lengths of the marks and lands;
    computing inherent contractile rates of all marks and lands from the computed deviation value and a probability of occurrence of each of the marks and lands;
    computing a difference value of the deviations by the combination of each of the marks and lands from the computed deviation value of each of the marks and lands; and
    setting the write strategy using the computed inherent contractile rates of all the marks and lands such that the computed difference value is minimized.

* * * * *